March 27, 1951 F. F. PFEFFERKORN 2,546,166
FOOD CONTAINER
Filed June 4, 1945 3 Sheets-Sheet 2
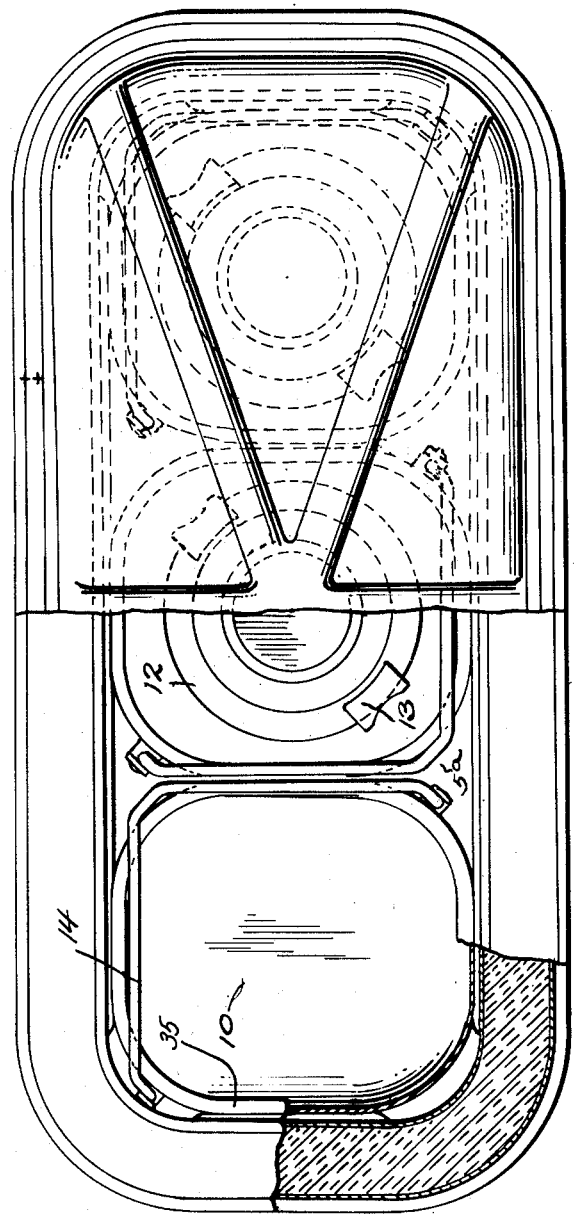
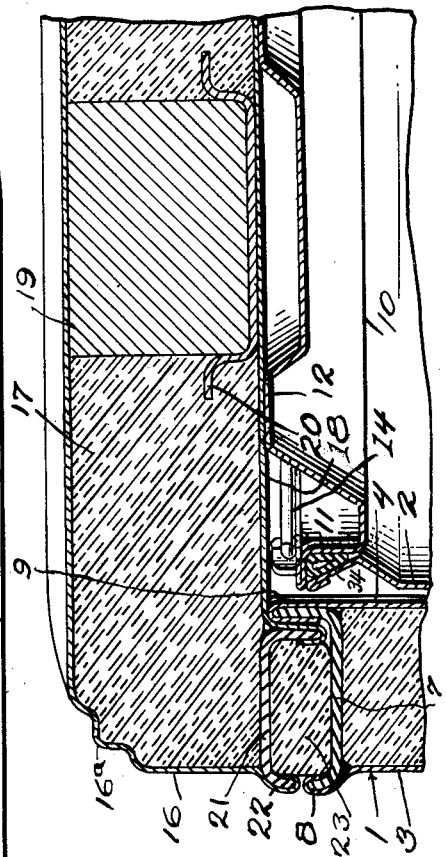
INVENTOR.
Frederick F. Pfefferkorn
BY
William F. Desmond
ATTORNEY March 27, 1951 F. F. PFEFFERKORN 2,546,166
FOOD CONTAINER Filed June 4, 1945 3 Sheets-Sheet 3

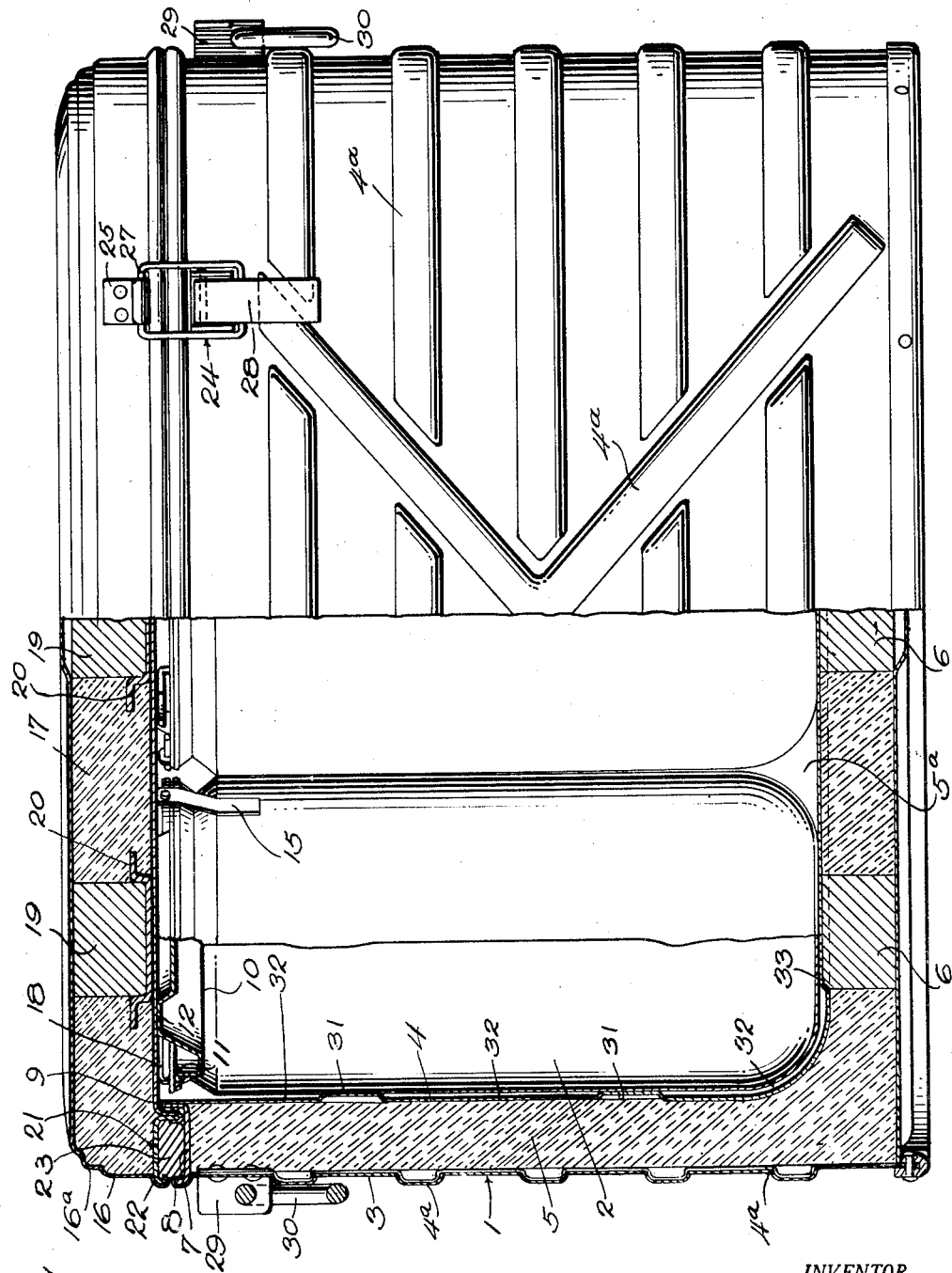

INVENTOR.
Frederick F. Pfefferkorn
BY
William F. Desmond
ATTORNEY

Patented Mar. 27, 1951 2,546,166

UNITED STATES PATENT OFFICE 2,546,166

FOOD CONTAINER

Frederick F. Pfefferkorn, Washington, D. C.

Application June 4, 1945, Serial No. 597,494

4 Claims. (Cl. 220—16)

(Granted under the act of March 3, 1883, as amended April 30, 1928; 370 O. G. 757)

The invention described herein, if patented, may be manufactured and used by or for the Government for governmental purposes, without the payment to me of any royalty thereon.

This invention relates to insulated food containers and more particularly to those of the portable type.

An object of this invention is to provide an insulated food container which may be conveniently mounted on a pack board strapped to a man's back.

Another object is to provide an insulated food container which will be large in size, light in weight, and durable in structure.

A further object is to provide an insulated food container adapted to carry therein several vertically disposed inserts in side-by-side relationship.

Further objects, advantages and features will be apparent from the following description, read in conjunction with the accompanying drawings in which:

Fig. 1 is a side elevation of the food container of my invention, parts being broken away and parts being shown in section.

Fig. 2 is a top view of the food container with the cover removed from a portion thereof, showing parts in section and parts broken away.

Fig. 3 is a detailed section of one of the corners of the container showing certain structural features.

Figure 4:
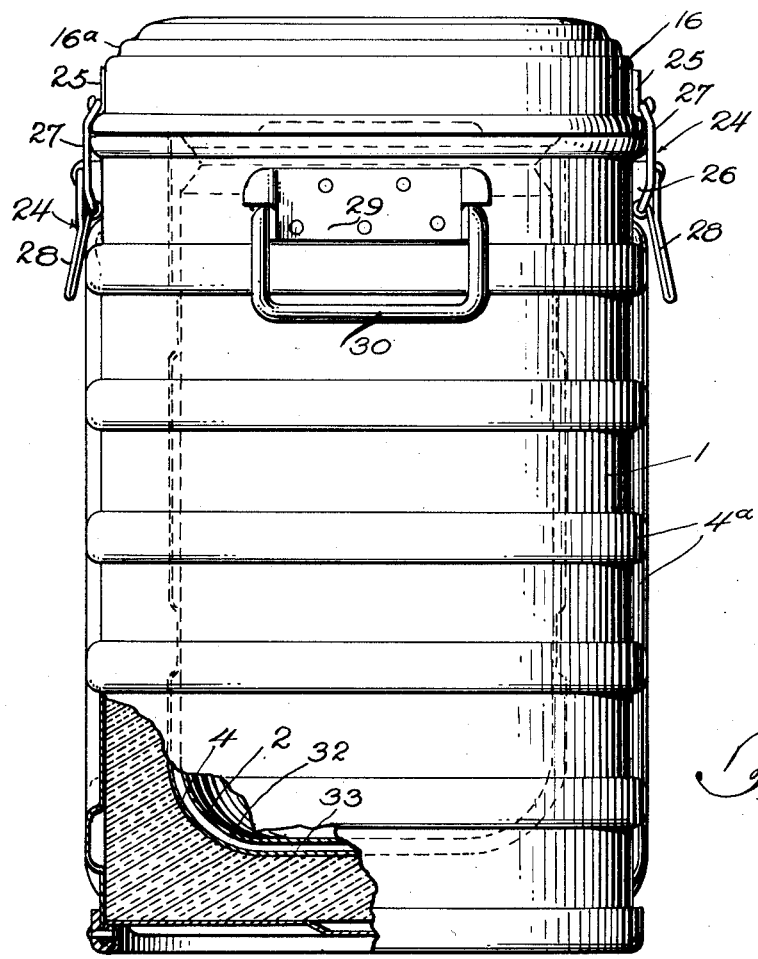
Fig. 4 is an end view of the container, a part being broken away.

Considerable difficulty has been experienced in trying to adapt insulated food containers of the conventional, commercial types for use by members of the armed forces in active theaters of operations. It has been found that containers of the conventional, commercial types are usually too small, too cumbersome due to their contour and not of sufficiently rugged construction to withstand rough usage. Generally speaking, they are usually round in contour. This makes them bulky and awkward to carry, for containers of this contour do not readily lend themselves to being strapped or attached to some item of equipment. Most of the conventional containers are not large enough to carry the quantity of food desired for the above-mentioned use. Since it was never intended that the conventional, commercial containers be subjected to extremely rough usage, it is apparent why they have not proved satisfactory in combat area.

Many of the conventional food containers are divided by partitions into compartments. Experience with containers of this type has revealed that the partitions get bent and twisted out of shape. When this happens, the inserts which are carried in these compartments no longer fit properly. Either they have to be wedged into position or they sit too loosely. Both of these conditions are undesirable, especially the latter because it causes the inserts to rattle, a condition which is extremely undesirable in combat areas where the men must move about noiselessly.

Another of the conventional food containers is the nested type. This type of container usually comprises a main container having a plurality of nested containers vertically disposed therein. This type of construction has proved inefficient and cumbersome because it is necessary to remove one or more of the containers to reach the bottom container in the nested structure. This procedure is not only time-consuming and inconvenient, but it results in a considerable loss of heat each time the containers are removed. Thus the food will not stay hot as long as it would if this operation were not necessary.

To overcome the above-mentioned disadvantages and to provide an insulated food container which will be suitable for use by members of the armed forces in active theaters of war, therefore, is the primary object of my invention. Referring to the accompanying drawings and more particularly to Figure 1 thereof, the container of my invention comprises a body portion 1, and a plurality of food receptacles 2 vertically disposed therein in side-by-side relationship. The body portion 1 and the receptacles 2 are preferably made of aluminum, or some similar durable light weight material.

The body 1 of the container comprises an outer wall 3 and an inner wall 4, insulated from each other by an insulating material 5, such as shredded Pliofoam, Texolite, rock wool or the like. The inner walls 4 define an inner compartment 5a adapted for the positioning therein of the receptacles 2. The outer wall 3 and the inner wall 4 are embossed substantially as shown at 4a in Figure 1 to give added stiffness and strength to the container, thus enabling it to withstand rough usage without losing its shape. A plurality of spacer blocks 6 of cork or some similar material may be disposed between the outer wall 3 and the inner wall 4 to insure uniform spacing of the said walls from each other.

The insulating efficiency of the container of my invention is increased considerably by the use of an outwardly dished collar 7 of any suitable non-conducting material, such as a plastic, circumferentially disposed between outer wall 3 and inner wall 4 to prevent metal-to-metal contact of the rim 8 of the outer wall 3 and the rim 9 of the inner wall 4. The rims 8 and 9 are bent back on themselves and joined to the collar 7 (Fig. 3). Collar 7 and rims 8 and 9 form a circumferential channel, one flange of which is higher than the other flange, for a purpose about to be explained.

The inner walls of the container are provided with projections 31 which circumscribe the entire inner compartment. The center portion of the bottom of the compartment 5a is raised substantially as shown at 33 in Figures 1 and 4. When the receptacles 2 are disposed in position in the compartment 5a, insulating air spaces 32 are provided which add to the thermal efficiency of the device.

The receptacles 2 are disposed vertically within the body of the container in side-by-side relationship. The dimensions of these receptacles 2 are such that when all of them are in position they fit snugly within the inner compartment 5a of the container. This prevents them from rattling in transit. Each of these receptacles 2, as is shown more particularly in Figures 2 and 3, has an inwardly and downwardly beveled rim 34 and is provided with an interfitting cover 10 preferably having a horizontally and vertically disposed rim portion and which has a gasket 11 attached thereto to provide a tight seal; gasket 11 preferably has an inclined outer surface to cooperate with beveled rim 34 of the body portion of receptacle 2. Each of the covers 10 has a planar peripheral portion 35 and an annular raised portion 12 and a handle comprising a pair of lugs 13 projecting from the periphery thereof, thus making it easy for an operator wearing gloves or mittens to remove the cover. Each of the receptacles 2 is provided with a bail 14, connected thereto through bail retainers 15, by means of which the receptacles may be removed from the compartment 5a of the container. Bail 14 is so dimensioned that it does not project laterally beyond the walls of receptacle 2, and rests on the peripheral portion 35 of cover 10 when receptacle 2 is placed in the container.

The container is provided with a cover 16 which is insulated similarly to the body. The cover 16, as illustrated in Figures 1 and 3, contains a packing of an insulating material 17, such as the material 5, inclosed by a cover liner 18. A plurality of spacer blocks 19 of cork may be disposed between the cover 16 and the cover liner 18 to insure uniform spacing of the cover from its liner. The cover is embossed as shown at 16a to reinforce and strengthen it. The cover liner 18 is reinforced by strips 20 disposed between the cover liner 18 and the spaced blocks 19. An outwardly dished collar 21, of laminated plastic similar to the collar 7 on the body portion of the container is disposed between the rim 22 of the cover 16 and the sides of the cover liner 18 for insulation purposes. A gasket 23 of sponge rubber or some similar material, is disposed between the collar 21 and the collar 7 to form a water-tight, air-tight seal between the cover and the body portion of the container. When the cover is closed, a flange of collar 21 overlaps the higher of the flanges of the channel formed by collar 7 and rims 8 and 9.

Any suitable mechanism may be employed to hinge the cover on the body of the container and lock it thereto when it is so desired. For example, draw bolts 24 may be used, two on each side of the container. The draw bolt 24, as shown in Figures 1 and 4, has a clasp 25 which is attached to the cover 16 and a retainer 26 which is attached to the body portion 1 of the container. The clasp 25 and the retainer 26 are provided with ring-like portions in which a loop 27 is supported. A lever 28 is pivotally mounted in the retainer 26. Pressure exerted on the lever 28 pushes the lower portion of the loop 27 inwardly towards the body portion of the container and thereby effectively secures the cover to the body of the container and presses the cover liner 18 against raised portions 12 of receptacle covers 10, thereby forcing the latter into simultaneous sealing contact with the beveled rims 34 of receptacles 2 to prevent spillage of food contained in such receptacles.

Each end of the body portion 1 of the container has attached thereto a retainer 29 which supports a handle 30 by means of which the container may be moved from place to place.

What I claim is:

1. A portable food container comprising a body portion having an inner and outer wall, said inner wall defining a compartment open at one end and comprising side walls and a bottom, insulating material disposed between said inner and outer walls, and an outwardly dished collar circumferentially disposed between said walls, so as to form a channel; a plurality of food receptacles supported in upright position and in side-by-side abutting relationship within said compartment, each of said food receptacles having a cover; and a closure on said compartment permitting individual insertion and removal of said food receptacles and adapted to cover the open end of said compartment, said closure being hingedly secured to said body portion, and said closure having an outside wall, a liner spaced from said outside wall, insulated material disposed between said outside wall and said liner, and an outwardly dished collar circumferentially disposed between the outside wall and the liner of said closure so as to form a channel, each of said first-named and second-named channels having an inner and outer flange and in at least one of said channels one of said flanges being of greater height than the other of said flanges, said higher flange overlapping the corresponding flange of the other channel when said closure is in compartment-closing position; the height of said food receptacles substantially corresponding to the distance between the bottom of said compartment and the inner wall of said closure; a gasket positioned in one of said channels; and means for releasably fastening said closure onto said body portion; whereby upon closing of said closure said gasket is compressed between said dished collars and the covers of said food receptacles are simultaneously pressed downwardly and spillage of food contained in said food receptacles is prevented.

2. A portable food container comprising a body portion having an inner and an outer wall spaced from said inner wall, said inner wall defining a compartment open at one end and comprising side walls and a bottom, insulating material disposed between said inner and outer walls, a plurality of food receptacles supported in upright position and in side-by-side abutting relationship within said compartment, each of said food receptacles having a body portion provided with an inwardly and downwardly beveled rim and a cover interfitting therewith, said cover having a horizontally and vertically disposed rim portion and a gasket having an inclined outer wall cooperating with the beveled rim of said body portion; and a closure on said compartment permitting individual insertion and removal of said food receptacles and adapted to cover the open end of said compartment, said closure being hingedly secured to said body portion, and said closure having an outside wall and a liner spaced from said outside wall; insulating material disposed between said outside wall and said liner; the height of said food receptacles including their covers substantially corresponding to the distance between the bottom of said compartment and the inner wall of said closure; and means for releasably fastening said closure onto said body portion; whereby the covers of said food receptacles are simultaneously pressed downwardly into sealing contact with said beveled rims of the body portions of said food receptacles and spillage of food contained in said food receptacles is prevented.

3. A portable food container comprising a body portion having an inner and outer wall, said inner wall defining a compartment open at one end and comprising side walls and a bottom, insulating material disposed between said inner and outer walls, and an outwardly dished collar circumferentially disposed between said walls, so as to form a channel; a plurality of food receptacles supported in upright position and in side-by-side abutting relationship within said compartment, each of said food receptacles having a body portion provided with an inwardly and downwardly beveled rim and a cover interfitting therewith; and a closure on said compartment permitting individual insertion and removal of said food receptacles and adapted to cover the open end of said compartment, said closure being hingedly secured to said body portion, and said closure having an outside wall, a liner spaced from said outside wall, insulating material disposed between said outside wall and said liner, and an outwardly dished collar circumferentially disposed between the outside wall and the liner of said closure so as to form a channel, each of said first-named and second-named channels having an inner and outer flange and in at least one of said channels one of said flanges being of greater height than the other of said flanges, said higher flange overlapping the corresponding flange of the other channel when said closure is in compartment-closing position; the height of said food receptacles substantially corresponding to the distance between the bottom of said compartment and the inner wall of said closure; a gasket positioned in one of said channels; and means for releasably fastening said closure onto said body portion; whereby upon closing of said closure said gasket is compressed between said dished collars and the covers of said food receptacles are simultaneously pressed downwardly into sealing contact with said beveled rims of the body portions of said food receptacles and spillage of food contained in said food receptacles is prevented.

4. A portable food container comprising a body portion having an inner and outer wall, said inner wall defining a compartment open at one end and comprising side walls and a bottom, insulating material disposed between said inner and outer walls, and an outwardly dished collar circumferentially disposed between said walls, so as to form a channel; a plurality of food receptacles supported in upright position and in side-by-side abutting relationship within said compartment, each of said food receptacles having a body portion provided with an inwardly and downwardly beveled rim and a cover having a horizontally and vertically disposed rim portion and a gasket having an inclined outer wall cooperating with the beveled rim of said body portion; and a closure on said compartment permitting individual insertion and removal of said food receptacles and adapted to cover the open end of said compartment, said closure being hingedly secured to said body portion, and said closure having an outside wall, a liner spaced from said outside wall, insulating material disposed between said outside wall and said liner, and an outwardly dished collar circumferentially disposed between the outside wall and the liner of said closure so as to form a channel, each of said first-named and second-named channels having an inner and outer flange and at least one of said channels having one flange of greater height than the other channel when said closure is in compartment-closing position; the height of said food receptacles substantially corresponding to the distance between the bottom of said compartment and the inner wall of said closure; a gasket positioned in one of said channels; and means for releasably fastening said closure onto said body portion; whereby upon closing of said closure said gasket is compressed between said dished collars and the covers of said food receptacles are simultaneously pressed downwardly into sealing contact with said beveled rims of the body portions of said food receptacles and spillage of food contained in said food receptacles is prevented.

FREDERICK F. PFEFFERKORN.

REFERENCES CITED

The following references are of record in the file of this patent:

UNITED STATES PATENTS

| Number | Name | Date |
| --- | --- | --- |
| 665,349 | Sewall | Jan. 1, 1901 |
| 998,490 | Fitch | July 18, 1911 |
| 1,016,346 | Markee | Feb. 6, 1912 |
| 1,244,866 | Kutscher | Oct. 30, 1917 |
| 1,896,393 | Devine | Feb. 7, 1933 |
| 2,097,186 | Hinnenkamp | Oct. 26, 1937 |
| 2,147,886 | Devine | Feb. 21, 1939 |
| 2,256,935 | Austin | Sept. 23, 1941 |
| 2,299,053 | Ferris | Oct. 13, 1942 |
| 2,385,146 | MacDonald | Sept. 18, 1945 |
| 2,415,767 | Shaw | Feb. 11, 1947 |

FOREIGN PATENTS

| Number | Country | Date |
| --- | --- | --- |
| 814,552 | France | Mar. 22, 1937 |